United States Patent [19]

Sakano et al.

[11] Patent Number: 4,835,215

[45] Date of Patent: May 30, 1989

[54] THERMOPLASTIC RESIN COMPOSITION

[75] Inventors: Hajime Sakano, Osaka; Akitoshi Ito, Mie; Motoichi Yano, Osaka; Yasuhiro Honda, Osaka; Takayoshi Fujiwara, Hyozo, all of Japan

[73] Assignee: Sugitomo Naugatuck Co., Ltd., Osaka, Japan

[21] Appl. No.: 948,427

[22] Filed: Dec. 31, 1986

Related U.S. Application Data

[60] Continuation of Ser. No. 746,689, Jun. 20, 1985, abandoned, which is a division of Ser. No. 549,381, Nov. 7, 1983, Pat. No. 4,554,316.

[30] Foreign Application Priority Data

Nov. 12, 1982 [JP] Japan .................. 57-199583

[51] Int. Cl.$^4$ .............................. C08L 51/04
[52] U.S. Cl. ...................... 525/71; 525/78; 525/83; 525/84

[58] Field of Search ............. 525/71, 78, 83, 84

[56] References Cited

U.S. PATENT DOCUMENTS

| | | | |
|---|---|---|---|
| 3,660,525 | 5/1972 | Kawahara | 525/74 |
| 3,868,433 | 2/1975 | Bartz et al. | 525/74 |
| 4,174,335 | 11/1979 | Ohdaira et al. | 525/71 |
| 4,237,037 | 12/1980 | Takahashi | 525/78 |
| 4,444,950 | 4/1984 | Sakano et al. | 525/74 |
| 5,676,526 | 7/1972 | Sommerfeld | 525/71 |

Primary Examiner—Wilbert J. Briggs, Sr.
Assistant Examiner—Robert E. L. Sellers, II

[57] ABSTRACT

A thermoplastic resin composition affording a delustered shaped article which comprises (A) a rubber-modified copolymer with (B) an epoxy group-containing olefin polymer or an unsaturated carboxylic acid-modified olefin polymer (B').

1 Claim, No Drawings

THERMOPLASTIC RESIN COMPOSITION

This application is a continuation, of application Ser. No. 746,689, filed June 20, 1985, now abandoned, which in turn is a divisional of Serial. No. 549,381, filed November 7, 1983, now U.S. Pat. No. 4,554,316.

The present invention relates to a thermoplastic resin composition. More particularly, it relates to a theroplastic resin composition comprising a rubber-modified copolymer which can provide a delustered (low gloss) shaped article.

Rubber-modified copolymers such as graft polymers of aromatic vinyl compounds, vinyl cyanides and/or alkyl unsaturated caroboylates onto rubbery polymers (e.g. acrylonitrile-butadiene rubber-styrene copolymer (ABS resin), methyl methacrylate-butadiene rubber-styrene copolymer (MBS resin), acrylonitrile-butadiene rubber-styrene-methyl methacrylate copolymer (ABSM resin), acrylonitrile-ethylene/propylene rubber-styrene copolymer (AES resin) are widely used in various fields due to their excellent and well-balanced physical properties. Particularly, they are used for manufacture of interior and exterior articles in automobiles.

In recent years, the interior articles of automobiles are frequently desired to be delustered (reduced the gloss) from the viewpoint of safety and harmony with other parts. For manufacture of delustered articles, there are usually adopted two procedures, of which one is the procedure using a mold having a special surface and the other is the procedure using a special material. In the former procedure, a resin compositin to be molded is so closely contacted with a mold having an embossed surface that the abrasion of the mold is remarkable. Therefore, embossing is required to be carried out repeatedly. Further, the state of luster (gloss) is varied with the conditions for molding. In the latter procedure, a filler or a rubbery polymer is incorporated into a resin composition to be molded, but the filler incorporation is not desirable in deterioration of the physical properties as well as the appearance, while the rubbery polymer incorporation is not favorable in producing a flow marks or wel marks to deteriorate the quality.

As a result of the extensive study, it has now been found that the incorporation of a certain polymeric material into a rubber-modified copolymer makes a shaped article of such rubber-modified copolymer delustered (low gloss) without any substantial deterioration of the excellent physical properties inherent thereto. This invention is based on the above finding.

According to the present invention, there is provided a thermoplastic resin composition comprising (A) a rubber-modified copolymer with (B) an epoxy group-containing olefin polymer or (B') an unsaturated carboxylic acid-modified olefin polymer, which can provide a shaped article being delustered.

The rubber-modified copolymer which is the component (A) is obtainable by polymerizing at least two kinds of monomers chosen from aromatic vinyl compounds, vinyl cyanides and alkyl unsaturated carbonxylates in the presence of a rubber(s). The resulting product comprises (a-1) a copolymer comprising units of the rubber and units of the monomers graft polymerized thereon (hereinafter referred to as "graft copolymer") usually with (a-2) a copolymer comprising units of the monomers (hereinafter referred to as "copolymer"). Alternatively, the graft copolymer (a-1) and the copolymer (a-2) may be separately produced and combined together to make a uniform composition usable as the component (A). In general, the rubber-modified copolymer (A) comprises the graft copolymer (a-1) and the copolymer (a-2) respectively in amounts of 5 to 100% by weight and of 95 to 0% by weight on the basis of the weight of the rubber-modified copolymer (A). When the content of the graft copolymer (a-1) is less than 5% by weight, the ultimate composition will be insufficient in impact strength.

The weight proportion of the rubber and the monomers in the graft copolymer (a-1) is normally from 5 : 95 to 70 : 30. The composition of the monomers is not limitative and may comprise, for instance, an aromatic vinyl compund(s) in a content of 50 to 80% by weight and a vinyl cyanide(s) and/or an alkyl unsaturated carboxylate(s) in a content of 50 to 20% by weight. No particular restriction is present on the particle size of the graft copolymer (a-1), and it may be usually from 0.05 to 5 micron, favorabley from 0.1 to 0.5 micron.

The composition of the monomers in the copolymer (a-2) is also not limitative and may comprise, for instance, an aromatic vinyl compound(s) in a content of 50 to 90% by weight and a vinyl cynadine(s) and/or an alkyl unsaturated carboxylate(s) in a content of 50 to 10% by weight. No special limitation is present on the intrinsic viscosity of the copolymer (a-2), and it may be ordinarily from 6.0 to 1.50 (when determined in dimethylformamide at 30° C.).

Examples of the rubber for the graft copolymer (a-1) are polybutadiene, styrene/butadiene copolymer, acrylonitrile/butadiene copolymer, ethylene/propylene copolymer, ethylene/propylene/non-conjugated diene (e.g. dicyclopentadiene, ethylidenenorbornene, 1,4-cyclohexadiene, 1,4-cycloheptadiene, 1,5-cyclooctadiene) copolymer, ethylene/vinyl acetate copolymer, chlorinated polyethylene, polyalkyl acrylate, etc. In case of the ethylene/propylene copolymer or the ethylene/propylene/non-conjugated diene copolymer, the molar ratio of ethylene and propylene may be from 5 : 1 to 1 : 3. The non-conjugated diene content in the ethylene/proplene/non-conjugated diene copolymer is preferred to be from 2 to 50 in terms of iodine value. Examples of the aromatic vinyl compound(s) are styrene, α-methylstyrene, methyl-α-methylstyrene, vinyltoluene, monochlorostyrene, etc. Examples of the vinyl cyanide(s) are acrylonitrile, methacrylonitrile, etc. Examples of the alkyl unsaturated carboxylate(s) are alkyl acrylates (e.g. methyl acrylate, ethyl acrylate, butyl acrylate), alkyl methacrylates (e.g. methyl methacrylate, ethyl methacrylate, butyl methacrylate), hydroxyalkyl acrylates (e.g. hydroxyethyl acrylate, hydroxypropyl acrylate), hydroxyalkyl methacrylate (e.g. hydroxyethyl methacrylate, hydroxypropyl methacrylate), etc.

For preparation of the rubber-modified copolymer (A), there may be adopted any conventional polymerization procedure such as emulsion polymerization, suspension polymerization, bulk polymerization, solution polymerization, emulsion-suspension polymerization and bulk-suspension polymerization.

The epoxy group-containing olefin polymer (B) is a copolymer of at least one of unsaturated epoxy compounds and at least one of olefins with or without at least one of ethylenically unsaturated compounds. While no special limitation is present on the composition of these monomers, the content of the unsaturated epoxy compound(s) is preferred to be from 0.5 to 95% by weight.

As the unsaturated epoxy compound(s), there may be used the ones having an unsaturated group copolymerizable with an olefin and an ethylenically unsaturated compound as well as an epoxy group in the molecule. For instance, unsaturated glycidyl esters, unsaturated glycidyl ethers, epoxyalkenes, p-glycidylstyrenes, etc. are usable. Those of the following formulas are also usable:

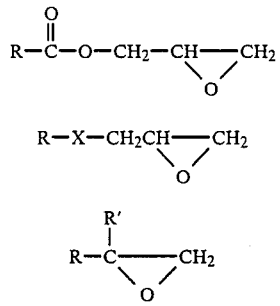

wherein R is a $C_2$–$C_{18}$ hydrocarbon group having an ethylenic unsaturation, R' is a hydrogen atom or a methyl group and X is —$CH_2O$—,

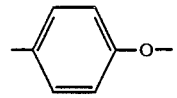

or

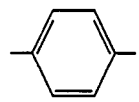

More specifically, the following compounds are exemplified: glycidyl acrylate, glycidyl methacrylate, glycidyl itaconate, butenecarboxylates, allyl glycidyl ether, 2-methylallyl glycidyl ether, styrene-p-glycidyl ether, 3,4-epoxybutene, 3,4-epoxy-3-methyl-1-butene, 3,4-epoxy-1-pentene, 3,4-epoxy-3-methyl-pentene, 5,6-epoxy-1-hexene, vinylcyclohexene monoxide, p-glycidylstyrene, etc.

Examples of the olefin(s) are ethylene, propylene, butene-1, 4-methylpentene-1, etc.

As the ethylenically unsaturated compound(s), there are exemplified olefins, vinyl esters having a $C_2$–$C_6$ saturated carboxylic acid moiety, acrylic and methacrylic esters having a $C_1$–$C_8$ saturated alcohol moiety, maleic esters having a $C_1$–$C_8$ saturated alcohol moiety, vinyl halides, vinyl ethers, N-vinyllactams, carbonamides, etc. These ethylenically unsaturated compounds may be copolymerized with the unsaturated epoxy compounds and the olefins in an amount of not more than 50% by weight, especially from 0.1 to 45% by weight based on the total weight of the monomers to be copolymerized.

The epoxy group-containing olefin polymer (B) may be prepared by various procedures, of which one typical example comprises contacting the unsaturated epoxy compound(s) and the olefin(s) with or without the ethylenically unsaturated compound(s) onto a radical generating agent at a temperature of 40° to 300° C. under a pressure of 50 to 4000 atm. Another typical example comprises irradiating gamma-rays to a mixture of polypropylene with the unsaturated epoxy compound(s) under a high degree of reduced pressure.

The unsaturated carboxylic acid-modified olefin polymer (B') is a copolymer of at least one of unsaturated carboxylic acids and their anhydrides and at least one of olefins with or without at least one of ethylenically unsaturated compounds. While any particular limitation is not present on the composition of these monomers, a preferred weight proportion of the unsaturated carboxylic acids and their anhydrides, the olefins and the ethylenically unsaturated compounds is 0.01–20:99.9–5:-0–50. In other words, the content of the unsaturated carboxylic acid(s) and /or their anhydride(s) is preferred to be from 0.01 to 20% by weight on the basis of the total weight of the monomers.

Examples of the unsaturated carboxylic acids and their anhydrides are monocarboxylic acids such as acrylic acid and methacrylic acid, dicarboxylic acids such as maleic acid, fumaric acid and itaconic acid, dicarboxylic acid anhydrides such as maleic anhydride and itaconic anhydride, etc. Especially preferred are dicarboxylic acids and their anhyrides.

As the olefins, there may be exemplified ethylene, propylene, butene-1, methylpentene-1, etc. Ethylene and propylene are particularly favored.

As the ethylenically unsaturated compounds, there are exemplified olefins, vinyl esters of $C_2$–$C_6$ saturated carboxylic acids, $C_1$–$C_8$ alkyl esters of acrylic or methacrylic acid, $C_1$–$C_8$ alkyl esters of maleic acid, vinyl halides, vinyl ethers, N-vinyllactams, carbonamides, etc.

The unsaturated carboxylic acid-modified olefin polymer (B') may be prepared by various procedures, of which one typical example comprises adding the unsaturated carboxylic acid and/or its anhydride to a polymer of the olefin with or without the ethylenically unsaturated compound and heating the resultant mixture.

No particular restriction is present on the amount of the epoxy group-containing olefin polymer (B) or the unsaturated carboxylic acid-modified olefin polymer (B') to be incorporated, and it may be usually from 0.1 to 40 parts by weight to 100 parts by weight of the weight of the rubber-modified copolymer (A). When the amount is less than the lower limit, a satisfactory dispersibility is not assured. When more than the upper limit, layer separation is apt to be formed in the shaped product. In view of the impact strength, weld strength and processability of the thermoplastic resin composition, the amount of the epoxy group-containing olefin polymer (B) or the unsaturated carboxylic acid-modified olefin polymer (B') is particularly preferred to be from 0.5 to 10 parts by weight.

For preparation of the thermoplastic resin composition of the invention, the said essential components may be mixed together in any optional order. Ford instance, all of them may be mixed together. Further, for instance, two of them may be first mixed together, followed by introduction of the remaining one into the resultant mixture. Mixing may be achieved by the use of any conventional mixing apparatus such as Bambury mixer, a monoaxial extruder or a biaxial extruder. If desired, any other resin such as a polyolefin resin (e.g. polyethylene, polypropylene, ethylene/propylene copolymer) and/or any additive(s) such a dyestuffs, pigments, stabilizer, plasticizers, antistatic agents, ultraviolet ray absorbers, flame retardant agents, lubricants and fillers may be incorporated into the thermoplastic resin composition.

Practical and presently preferred embodiment of the invention are illustratively shown in the following Examples wherein % and part(s) are by weight unless otherwise indicated.

EXAMPLES 1 to 3 AND COMPARATIVE EXAMPLES 1 to 4

According to the prescription as shown in Table 1, the rubber-modified copolymer (A) and the epoxy group-containing olefin polymer (B) or a conventional delustering agent (gloss reducing agent) were mixed together by the aid of a Bambury mixer. The resultant mixture was pelletized, and the pellets were molded to make a test piece. The test piece was subjected to measurement of the physical properties including the surface gloss. The results are shown in Table 1.

The rubber-modified copolymer (A) as used was a heat resistant ABS resin "KRALASTIC K-2938A" manufactured by Sumitomo Naugatuck Co., Ltd.

The epoxy group-containing olefin polymer (B) was the one manufactured as set forth below:

In an autoclave, a mixture of ethylene and glycidyl methacrylate with or without vinyl acetate pressurized to 2000 kg/cm$^2$ was charged, and di-t-butyl peroxide as the catalyst was introduced therein. The resultant mixture was maintained at a temperaature of 150° to 300° C. while stirring for several minutes, during which bulk polymerization proceeded. From the reaction mixture, the produced copolymer was separated and recovered by the aid of a separator.

EXMAPLES 4 to 6 AND COMPARATIVE EXAMPLES 5 to 8

According to the prescription as shown in Table 2, the rubber-modified copolymer (A) and the epoxy group-containing olefin polymer (B) or a conventional delustering agent (gloss reducing agent) were mixed together by the aid of Bambury mixer. The resultant mixture was pelletized, and the pellets were molded to make a test piece. The test piece was subjected to measurement of the physical properties including the surface gloss. The results are shown in Table 2.

The rubber-modified copolymer (A) as used was the one manufactured as set forth below:

Ethylene-propylene-ethylidene norbornene copolymer (iodine value, 8.5; Mooney viscosity, 61; propylene content, 43%) (20 parts), styrene (55 parts) and acrylonitrile (25 parts) were subjected to polymerization by a conventional solution polymerization procedure to obtain as AES resin (I).

Ethylene-propylene-ethylidene norbornene copolymer (iodine value, 8.5; Mooney viscosity, 61; propylene content, 43%) (30 parts), styrene (50 parts) and acrylonitrile (20 parts) were subjected to polymerization by a conventional suspension polymerization procedure to produce a resin. The resin was admixed with styrene-acrylonitrile copolymer (weight ratio=70 : 30) prepared by suspension polymerization in a weight proportion of 1 : 1 in the state of beads to obtain an AES resin (II).

The epoxy group-containing olefin polymer (B) was the one as used in Examples 1 to 3.

TABLE 1

| Composition | Example 1 | Example 2 | Example 3 | Comparative Example 1 | Comparative Example 2 | Comparative Example 3 | Comparative Example 4 |
|---|---|---|---|---|---|---|---|
| Rubber-modified copolymer (A) (part(s)) ABS resin | 100 | 100 | 100 | 100 | 100 | 100 | 100 |
| Epoxy group-containing olefin polymer (B) (part(s)) | | | | | | | |
| (i) E-GMA-VA*$^1$ | 3 | — | 1 | — | — | — | — |
| (ii) E-GMA*$^2$ | — | 5 | — | — | — | — | — |
| Talc*$^3$ (part(s)) | — | — | — | — | 5 | — | — |
| Styrene-butadiene block polymer*$^4$ | — | — | — | — | — | 3 | 5 |
| Notched Izod impact strength ($\frac{1}{4}$", 23° C.) (kg · cm/cm$^2$) | 18.5 | 17.5 | 18.8 | 18.0 | 10.0 | 19.0 | 19.5 |
| Heat distortion temperature (264 psi, no annealing) (°C.) | 98.0 | 97.5 | 98.3 | 98.5 | 105 | 92.0 | 90.5 |
| Flow mark | No | No | No | No | Yes | Yes | Yes |
| Gloss (deluster) (60° specular gloss) (%) | 25 | 20 | 30 | 90 | 40 | 55 | 45 |

Notes:
*$^1$Ethylene-glycidyl methacrylate-vinyl acetate copolymer (molar ratio = 90:7:3)
*$^2$Ethylene-glycidyl methacrylate copolymer (molar ratio = 90:10)
*$^3$"Micron white No. 5000" manufactured by Hayashi Kasei
*$^4$"Toughprene" manufactured by Asahi Kasei

TABLE 2

| Composition | Example 4 | Example 5 | Example 6 | Comparative Example 5 | Comparative Example 6 | Comparative Example 7 | Comparative Example 8 |
|---|---|---|---|---|---|---|---|
| Rubber modified copolymer (A) (part(s)) | | | | | | | |
| AES resin (I) | 100 | 100 | — | 100 | 100 | 100 | — |
| AES resin (II) | — | — | 100 | — | — | — | 100 |
| Epoxy group-containing olefin copolymer (B) (part(s)) | | | | | | | |
| (i) E-GMA-VA*$^1$ | 3 | — | 1 | — | — | — | — |
| (ii) E-GMA*$^2$ | — | 5 | — | — | — | — | — |
| Talc*$^3$ (parts(s)) | — | — | — | — | 5 | — | — |
| Styrene-butadiene block polymer*$^4$ | — | — | — | — | — | 3 | 5 |
| Notched Izod impact strength | 48.5 | 51.5 | 35.0 | 43.3 | 12.5 | 48.3 | 51.5 |

TABLE 2-continued

| Composition | Example 4 | Example 5 | Example 6 | Comparative Example 5 | Comparative Example 6 | Comparative Example 7 | Comparative Example 8 |
|---|---|---|---|---|---|---|---|
| (¼", 23° C.) (kg · cm/cm²) | | | | | | | |
| Heat distortion temperature (264 psi, no annealing) (°C.) | 90.5 | 90.5 | 91.0 | 90.0 | 94.0 | 85.0 | 84.3 |
| Flow mark | No | No | No | No | Yes | Yes | Yes |
| Gloss (deluster) (60° specular gloss) (%) | 15 | 10 | 35 | 95 | 20–55 | 75 | 65 |
| Weather resistance (after exposure by Weather-O-Meter for 1000 hours) | | | | | | | |
| Izod impact strength without notch (¼", −30° C.) (kg · cm/cm²) | 175 | 190 | 145 | 155 | 75 | 83 | 72 |
| Color difference (ΔE) | 1.5 | 2.0 | 2.0 | 1.8 | 2.1 | 8.5 | 10.8 |

Notes: *1 *2 *3 and *4 same as in Table 1.

EXAMPLES 7 AND 8

According to the prescription as shown in Table 3, the rubber-modified copolymer (A) and the unsaturated carboxylic acid-modified olefin polymer (B') were mixed together by the aid of Bambury mixer. The resultant mixture was pelletized, adn the pellets were molded to make a test piece. The test piece was subjected to measurement of the physical properties including the surface gloss. The results are shown in Table 3.

The rubber-modified copolymer (A) as used was the heat resistant ABS resin "KRALASTIC K-2938A" as used in Example 1 or the AES resin (I) as used in Example 4.

The unsaturated carboxylic acid-modified olefin polymer (B') was the one manufactured as set forth below:

Maleic anhydride (0.5 part) was added to powdery polyethylene (100 parts), and the resultant mixture was kneaded well by two rolls at 200° C. for about 3 minutes and shaped to obtain a sheet. After cooling, the sheet was pulverized by the aid of a die of 3 mm square.

TABLE 3

| Composition | Example 7 | Example 8 |
|---|---|---|
| Rubber-modified copolymer (A) (part(s)) | | |
| ABS resin | 100 | — |
| AES resin (I) | — | 100 |
| Unsaturated carboxylic acid modified olefin polymer (B') (part(s)) | 3 | 3 |
| Notched Izod impact strength (¼", 23° C.) (kg · cm/cm²) | 18.0 | 45.0 |
| Heat distortion temperature (264 psi, no annealing) (°C.) | 98.0 | 90.5 |
| Flow mark | No | No |
| Gloss (deluster) (60° specular gloss) (%) | 28 | 20 |
| Weather resistance (after exposure by Weather-O-Meter for 1000 hours) | | |
| Izod impact strength without notch (¼", −30° C.) (kg · cm/cm²) | — | 165 |
| Color difference (ΔE) | — | 1.8 |

What is claimed is:

1. A delustered shaped article prepared by molding a thermoplastic resin composition which comprises
   (A) a rubber-modified copolymer obtained by polymerizing at least two kinds of monomers selected from different members of the group consisting of aromatic vinyl compounds, vinyl cyanides and alkyl unsaturated carbonylates in the presence of at least one of rubbers,
   said rubber-modified copolymer (A) comprising (a-1) a graft copolymer comprising (i) a rubber comprising units from a diene and (ii) units of at least two kinds of monomers selected from the group consisting of styrene, acrylonitrile and methyl methacrylate graft polymerized thereon and (a-2) a copolymer comprising units of at least kinds of monomers chosen from styrene or alpha-methylstyrene, acrylonitrile and methyl methacrylate, the contents of the graft copolymer (a-1) and the copolymer (a-2) being respectively from 5 50% by weight and 50 to 95% by weight based on the weight of the rubber-modified copolymer (A), and
   (B') an unsaturated carboxylic acid-modified olefin polymer which is a copolymer of reactants comprising unsaturated carboxylic acid or anhydride thereof and olefin,
   the weight proportion of the rubber-modified olefin copolymer (A) and the unsaturated carboxylic acid-modified olefin polymer (B') in said composition being 100:0.5–40.

* * * * *

UNITED STATES PATENT AND TRADEMARK OFFICE
CERTIFICATE OF CORRECTION

PATENT NO. : 4,835,215

DATED : May 30, 1989

INVENTOR(S) : HAJIME SAKANO ET AL

It is certified that error appears in the above-identified patent and that said Letters Patent is hereby corrected as shown below:

On the cover page, the assignee should be - - Sumitomo Naugatuck Co., Ltd.

On the cover page, under "U.S. PATENT DOCUMENTS", " 5,676,526" should be - - 3,676,526 - -

On the cover page, there should be listed under "FOREIGN PATENT DOCUMENTS," - - 2914270  10/79  Fed. Rep. of Germany - -

Claim 1 (column 8, line 33), "carbonylates" should be - - carboxylates - -

Claim 1 (column 8, line 45), "5 50% should be - - 5 to 50% - -

Signed and Sealed this

Twelfth Day of December, 1989

*Attest:*

JEFFREY M. SAMUELS

*Attesting Officer*  *Acting Commissioner of Patents and Trademarks*